United States Patent Office 3,544,291
Patented Dec. 1, 1970

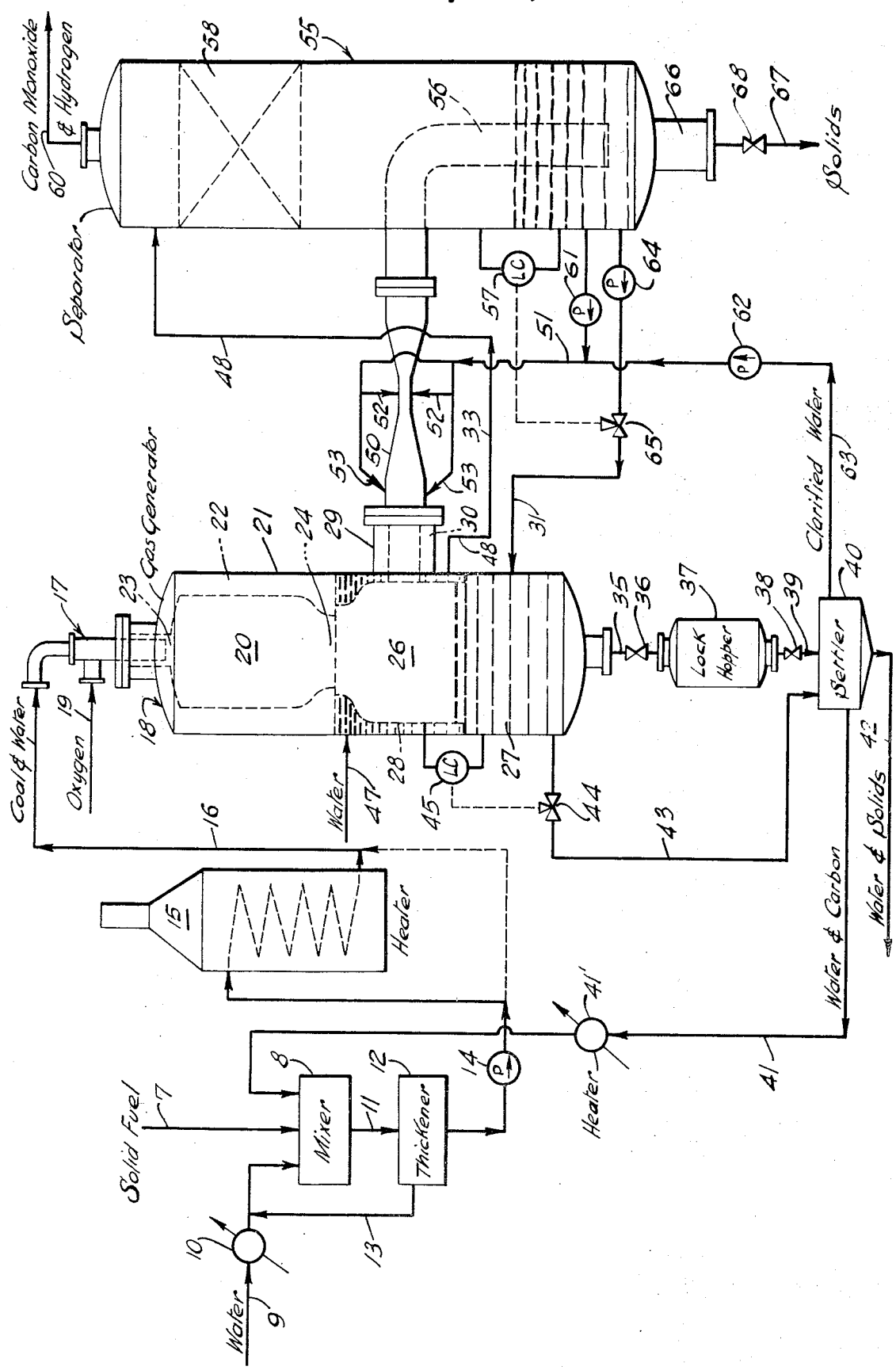

3,544,291
COAL GASIFICATION PROCESS
Warren G. Schlinger, Pasadena, and William L. Slater, La Habra, Calif., assignors to Texaco Inc., New York, N.Y., a corporation of Delaware
Filed Apr. 22, 1968, Ser. No. 722,922
Int. Cl. C10j 3/16
U.S. Cl. 48—206            5 Claims

ABSTRACT OF THE DISCLOSURE

A process for gasification of solid fuel by partial oxidation to produce carbon monoxide and hydrogen in a flow type suspension gasification reaction system in which pulverized solid fuel, such as coal or petroleum coke, is supplied to the reactor as a slurry with water and reacted with oxygen at an autogeneous temperature above about 1800° F.

---

This invention relates to a process for the production of carbon monoxide and hydrogen, i.e. synthesis gas, from solid carbonaceous fuels, by partial oxidation with an oxygen-containing gas. In one of its more specific aspects, the present invention relates to gasification of solid carbonaceous fuels in a non-catalytic flow type reaction in which a slurry of solid fuel in water in liquid phase is fed into a reaction zone maintained at an autogenous temperature in the range of 1800 to 3000° F. and reacted therein with relatively pure oxygen.

The generation of carbon dioxide and hydrogen, or synthesis gas, by non-catalytic reaction of solid carbonaceous fuel with oxygen or oxygen-enriched air is known. Partial oxidation of solid fuels, such as coal or petroleum coke, represents a highly economical method for the production of synthesis gas in large quantities. In the flow-type gasifier or partial oxidation process, solid fuel is reacted with an oxygen-containing gas, preferably relatively pure oxygen, in a closed, compact reaction zone in the absence of packing or catalyst at an autogenous temperature within the range of about 1800 to about 3200° F., preferably at a temperature in the range of 2000 to 2800° F.

Usually the solid fuel, in fine particle form, is suspended in steam and introduced into the reaction zone where it comes into contact with a limited amount of oxygen. Substantially instantaneous reaction takes place to produce carbon monoxide and hydrogen as the principle products of reaction. The gasification process operates most efficiently at elevated pressures, e.g., 100 to 800 p.s.i.g., and at temperatures above the melting point of the ash from the coal or coke so that a fluid molten slag is produced. The molten slag is discharged from the reactor through an outlet port or opening in the wall of the reactor, preferably at one end of the reaction zone into a relatively cold slag quench zone containing water into which the slag drops and wherein the slag is quench-cooled and solidified.

In addition to carbon monoxide and hydrogen, the product gas stream usually contains carbon dioxide, methane and entrained, unconverted carbon. Carbon produced in the process may be in the form of very fine particles of soot and in the form of unconverted portions of the solid fuel. Carbon may be recovered from the product gas stream by contacting the gas stram with water in a suitable gas-liquid contacting apparatus, and returned to the synthesis gas generator as fuel.

The amounts of oxygen as supplied to the reaction zone is restricted relative to the fuel supply so that near maximum yields of carbon monoxide and hydrogen are obtained from the gasification reaction. Usually it is preferable to employ high purity oxygen, i.e. oxygen-rich gas streams containing in excess of 95 percent oxygen by volume. Such oxygen concentrations are readily available from commercial oxygen plants.

At the present, accepted practice is to form a dispersion or suspension of pulverized solid fuel in a carrier gas, such as recycle product gas, steam, or a mixture of synthesis gas and steam and discharge the dispersion into the reaction chamber into admixture with oxygen separately introduced into the reaction zone.

A particularly effective method of dispersing pulverized solid fuel in steam is disclosed in U.S. Pat. No. 2,987,387 to C. R. Carkeek et al. In this process, solid fuel is mixed with water or aqueous carrier and passed at relatively high velocity into a monotube boiler wherein the water is converted to steam forming a dispersion of solid particles in steam. The resulting dispersion is then fed to a flow-type gasifier. One disadvantage of the prior art process is the difficulty in maintaining the heaters which are subject to scale formation on the inner surface of the heater tubes and erosion from the solid particles. The process of the present invention avoids these problems by obviating the necessity for the use of boilers or heaters for the coal-water slurry feed to the gas generator.

We have now discovered that, contrary to present practice, it is possible to gasify coal successfully in a reactor system in which the coal is supplied directly to the hot gasification reaction chamber maintained at a temperature above 1800° F. as a water slurry using sufficient water to carry the coal as a fluid pumpable slurry of coal in water. For convenience in the description of the process of this invention, reference is made to coal or coke as solid carbonaceous fuel. It is to be understood however that in addition to petroleum coke, various coals, such as lignite, sub-bituminous coal, bituminous coal, anthracite, and other solid hydrocarbons and carbon-rich solids may be gasified by the process of our invention.

Fluid or pumpable slurries of granular solid fuels in liquid carrier media may be prepared by mixing pulverized coal or coke with approximately equal parts by weight of the carrier liquid. Suitable carrier liquids comprise water, hydrocarbon oils, and water and oil emulsions. A slurry of coal or coke in water containing from about 45 to 55 water percent granular solid and water to insure fluidity of the slurry is preferred in the process of this invention. Excess water should be avoided since it imposes a heat load on the reactor and reduces the efficiency of oxygen utilization in the reaction. Hydrocarbon liquid may be present in the slurry in an amount not in excess of 25% of the slurry by weight.

The accompanying drawing is a diagrammatic elevational view of a suitable arrangement of apparatus illustrating a preferred embodiment of the process of this invention.

With reference to the drawing, solid fuel, such as coal or coke, from a suitable source is supplied through line 7 to a mixer 8 wherein it is mixed with carrier liquid to form a fluid slurry. Water may be supplied to mixer 8 from line 9. From mixer 8 a fluid mixture or slurry of coal and water is passed through line 11 to a thickener 12 in which excess water is eliminated from the mixture to form a pumpable fluid slurry of coal and water containing from about 45 to about 55 water percent solid fuel. Excess water is returned from the thickener 12 to a mixer 8 via line 13.

Slurry is withdrawn from thickener 12 by pump 14 and passed through heater 15 and line 16 to a suitable mixer-burner 17 associated with synthesis gas generator or gassifier 18. The slurry of coal in water is heated in heater 15 to a temperature not exceeding the boiling point of water at the pressure existing in reaction zone 20. If desired, heater 15 may be omitted entirely. Oxygen from a suitable supply source is introduced through line 19 to burner 17. A slurry of solid fuel in water is discharged through a central duct of burner 17 directly into the upper end of reaction zone 20 of gassifier 18 into admixture with oxygen from line 19. Details of burner structures suitable for use as burner 17 in the gas generator are known. Suitable burners are described in detail in U.S. Patents 2,928,459 and 2,928,460 to Eastman et al., issued Mar. 15, 1960.

Preheater 15, when employed, reduces the heat load on the gas generator and improves the efficiency of utilization of both fuel and oxygen. With coal as the solid fuel for the gas generator, the amount of slurry feed preheat is preferably limited to prevent vaporization of water from the slurry in the preheater. In such case, all of the water required for the generation of synthesis gas in reaction zone 20 is supplied in liquid phase. When petroleum coke is employed as fuel for the gas generator, part of the water, e.g., from 0 to about 90 percent by weight, may be vaporized in the slurry feed preheater without excessive scale formation.

The synthesis gas generator 18 comprises a cylindrical pressure vessel 21 with a refractory lining 22 defining a cylindrical compact, unpacked reaction zone 20. The mixture of coal, water and oxygen is injected by burner 8 axially into the upper end of reaction zone 20 through inlet passageway 23. Products of reaction are discharged axially from the lower end of reaction zone 20 through an outlet passageway 24 into a slag quench chamber 26. A pool of water 27 is maintained in the lower portion of quench chamber 26 and a water jacket 28 is provided in the upper portion of chamber 26 to protect the pressure vessel shell from becoming overheated by hot gases from the gas generator. Unconverted solid fuel and slag or ash from the solid fuel is discharged with the product gas stream through outlet 24 into the slag quench chamber 26 where the larger particles of solid and any molten ash or slag drops into the pool of water. Gas is discharged from chamber 26 through line 29 provided with a refractory lining 30.

In reaction zone 20 of gas generator 18, the mixture of solid fuel, water, and oxygen discharged from burner 17 react to produce synthesis gas comprising carbon monoxide and hydrogen at an autogenous temperature above about 1800° F., e.g. at a temperature in the range of 2000 to 2800° F. The resulting product gas or synthesis gas, comprises carbon monoxide and hydrogen and contains minor amounts of carbon dioxide, inert atmospheric gases, and solid carbon. The term "synthesis gas" is used herein for convenience to include mixtures of carbon monoxide and hydrogen suitable as starting materials for synthesis of hydrocarbons and alcohols, as a source of hydrogen for hydrogenation reactions and ammonia synthesis, and as reducing gas for ore reduction and the like.

The relative proportions of solid fuel, water and oxygen in the feedstream to the gas generator are carefully regulated to convert a substantial portion of the carbon, e.g., about 85 percent by weight, to carbon oxides and to maintain an autogenous reaction zone temperature in the range of 1800 to 3200° F., preferably in the range of 2000 to 2800° F. Unconverted carbon and ash are contained in the product gas stream. The product gas stream also contains carbon dioxide, for example, in the range of 10 to 20 volume percent of the product gas, dry basis, some of which may be produced by the water gas shift reaction. Some nitrogen and argon are usually also included in the product gas, depending upon the purity of the fuel and oxygen supplied to the process.

Ash and unconverted carbon from the solid fuel, is collected in the water in slag quench chamber 26. Any molten ash or slag formed in the reaction zone and discharged from outlet 24 of reaction chamber 20 drops directly into the pool of water 27 in the slag chamber 26 where it is quickly cooled to form granular solid particles. Water is supplied to the slag quench chamber 26 through line 31. Accumulations of solid material, for example, solidified slag or ash, and unconverted carbon from the fuel is withdrawn as required from slag chamber 26 through line 35 as controlled by valve 36 into lock hopper 37. Accumulated solid material from lock hopper 37 is discharged through line 39 as controlled by valve 38. In the operation of the lock hopper, valve 36 is opened and valve 38 closed during the filling period in which solid material from slag chamber 26 is transferred to lock hopper 37. Valve 36 is then closed and the lock hopper 37 emptied through line 39 by opening valve 38. A suitable lock hopper arrangement is described in U.S. Patent 2,931,715 to du Bois Eastman issued Apr. 15, 1956. From lock hopper 37, solid residue and water are discharged through line 39 to a settler 40.

From settler 40, water and unconverted carbon may be withdrawn through line 41 to mixer 8 for inclusion in the slurry feed mixture to the synthesis gas generator. Water and solids relatively lean in carbon are discharged through line 42. Water is withdrawn from slag quench chamber 26 through line 43 to settler 40 as controlled by valve 44 in response to liquid level controller 45 to maintain a substantially constant water level in slag quench chamber 26.

An internal water jacket 28 is provided within the pressure vessel shell 21 at the upper portion of slag quench chamber 26. Water jacket 28 prevents overheating of the pressure vessel shell below the level of refractory 22 surrounding reaction zone 20 and above the level of the pool of water in chamber 26. Water is introduced into water jacket 28 from line 47 and discharged therefrom through line 48.

Hot product gases discharged from the synthesis gas generator reaction zone 20 through outlet 24 into the upper portion of slag quench zone 26 are discharged from the slag quench zone through transfer line 29 to a gas-liquid contactor 50. Water is injected into contactor 50 from line 51 through injectors 52 and 53. Intimate contact between product gas from line 29 and water from line 51 is effected in contactor 50 which is preferably in the form of a venturi, nozzle, or plate orifice. In contactor 50, the gas stream is accelerated and water is injected into the accelerated gas stream at the throat of the nozzle, venturi or orifice, from a plurality of injectors 52, two of which are illustrated diagrammatically in the drawing. In addition, water is injected into the inlet end of contactor 50 from a plurality of injectors 53, two of which are illustrated diagrammatically in the drawing, to prevent overheating of the contactor by the hot product gas.

The resulting mixture of gas and water formed in contactor 50 is directed into separator 55 through a dip leg 56 which extends downwardly into the lower portion of separator 55. The gas stream from contactor 50 also carries entrained solid particles of unconsumed fuel or ash. A body of water is maintined in the separator 55, the level of which may be controlled in any suitable manner, for example by means of a liquid level controller 57, shown diagrammatically. Conduit 56 discharges the mixture of water and gas below the level of water contained in the separator. By discharging the mixture of gas and water through the open end of conduit 56 into intimate contact with the water, solid particles from the gas stream are trapped in the water.

Separator 45 is suitably in the form of a tower having a packed section 58 above the point of entry of the gas stream from contactor 50. Water from line 48 is introduced into separator 55 above the level of the packing material 58. In packed section 58, the gas stream is intimately contacted with water in the presence of suitable packing material, such as ceramic shapes, effecting substantially complete removal of solid particles from the gas stream. Product gas, comprising carbon monoxide and hydrogen and containing water vapor, atmospheric gases and carbon dioxide, is discharged from the upper end of separator 55 through line 60 at a temperature corresponding to the equilibrium vaporization temperature of water at the pressure existing in separator 55. Clean product gas from line 60 may be further processed, for example, for the production of hydrogen by water-gas shift reaction and suitable purification.

Water from the lower portion of separator 55 is passed by pump 61 through line 51 to injectors 52 and 53. Clarified water from settler 40 also may be supplied to line 51 by pump 62 through line 63. Water is withdrawn from separator 55 by pump 64 and passed through valve 65 responsive to liquid level control 57 into quench zone 26 via line 31 to control the liquid level in separator 56.

Any heavy solid particles removed from the gas stream in separator 56 settle from the water slurry and are collected in leg 66 from which they may be discharged at periodic intervals through line 67 as controlled by valve 68.

SPECIFIC EXAMPLES

The following examples illustrate the process of this invention wherein a slurry of coke in water is employed without preheat as feed to an unpacked, flow-type synthesis gas generator having an internal volume of 11.75 cubic feet. Coke feed for the examples had the following ultimate analysis, expressed in weight percent.

ANALYSIS OF FUEL

|  | Examples 1-3 | Example 4 |
|---|---|---|
| Carbon | 88.01 | 85.77 |
| Hydrogen | 3.63 | 3.65 |
| Oxygen | 3.06 | 4.24 |
| Nitrogen | 2.30 | 2.21 |
| Sulfur | 1.09 | 1.05 |
| Unknown | 1.91 | 3.08 |

A summary of operating conditions and results is shown in the following tabulation.

| Example No. | 1 | 2 | 3 | 4 |
|---|---|---|---|---|
| Fuel feed: | | | | |
| Coke, lbs./hr | 527.8 | 566.0 | 581.0 | 522 |
| Water, lbs./hr | 487.2 | 479.0 | 479.0 | 463 |
| Coke in feed slurry, wt. percent | 52.0 | 54.2 | 54.8 | *51.0 |
| Temperature at burner, °F | 83 | 106 | 102 | -------- |
| Oxygen feed: | | | | |
| Rate, s.c.f.h | 7,313 | 7,228 | 7,370 | 6,467 |
| Temperature at burner, °F | 300 | 293 | 293 | -------- |
| slurry. | | | | |
| Process conditions: | | | | |
| Generator temperature, °F | 2,500 | 2,561 | 2,635 | 2,410 |
| Generator pressure, p.s.i.g | 390 | 403 | 201 | 400 |
| Duration of run, hrs | 3 | 8 | 5 | 3 |

| Example No. | 1 | 2 | 3 | 4 |
|---|---|---|---|---|
| Product: | | | | |
| Rate, dry basis, s.c.f.h | 22,064 | 22,099 | 21,205 | 23,126 |
| Composition, vol percent | | | | |
| Hydrogen | 33.12 | 34.24 | 32.19 | 37.17 |
| Carbon monoxide | 46.46 | 45.99 | 49.01 | 42.89 |
| Carbon dioxide | 19.00 | 18.69 | 17.76 | 18.92 |
| Methane | 0.02 | 0.05 | 0.09 | .16 |
| Carbonyl sulfide | 0.04 | 0.02 | 0.04 | .02 |
| Hydrogen sulfide | 0.10 | 0.18 | 0.00 | .03 |
| Nitrogen | 1.15 | 0.68 | 0.78 | .69 |
| Argon | 0.11 | 0.15 | 0.13 | .12 |
| Performance | | | | |
| Oxygen/fuel ratio, s.c.f/lb | 13.86 | 12.77 | 12.68 | 12.39 |
| Water/fuel ratio, lb./lb | 0.92 | 0.85 | 0.82 | 0.89 |
| Oxygen/carbon ratio, atom/atom | 0.996 | 0.918 | 0.912 | 0.914 |
| $H_2+CO$, s.c.f.h., forced | 17,740 | 17,780 | 17,590 | 17,820 |
| Oxygen consumption, s.c.f./m.s.c.f. | | | | |
| MSCF $H_2+CO$ net | 412.3 | 406.4 | 419.0 | 362.9 |
| Unconverted carbon, wt., percent | 0.51 | 8.82 | 10.31 | 2.47 |

* In addition to coke, 2% molasses by weight was included in the feed

We claim:
1. In a process for generation of carbon monoxide and hydrogen from solid fuel in an unpacked reaction zone by direct partial oxidation with oxygen and steam at an autogeneous temperature in the range of 1800 to 3000° F., the improvement which comprises introducing said solid fuel in fine particle form into said reaction zone as a slurry with water in liquid phase containing 45 to 55 percent solid fuel by weight, and supplying oxygen-containing gas to said reaction zone into admixture with said slurry at the point of introduction of said slurry into said reaction zone effecting conversion of at least 75 percent of the carbon contained in said fuel to carbon oxides and autogenously maintaining said temperature within said range of 1800 to 3000° F.

2. A method as defined in claim 1 wherein said reaction is carried out at a pressure in the range of 100 to 3000 p.s.i.g.

3. A process as defined in claim 1 wherein hydrocarbon liquid is included in said slurry in an amount not in excess of 25 percent of said slurry by weight.

4. A process according to claim 1 wherein said oxygen-containing gas comprises at least 95 percent oxygen by volume.

5. A process according to claim 1 wherein said slurry is preheated to a temperature below the vaporization temperature of water at the pressure existing within said gas generation zone prior to introduction of said slurry into said reaction zone.

References Cited

UNITED STATES PATENTS

| 2,059,536 | 11/1936 | Russell | 48—212 |
| 2,864,677 | 12/1958 | Eastman | 48—206 |
| 2,946,670 | 7/1960 | Whaley | 48—206 |
| 2,987,387 | 6/1961 | Carkeek | 48—206 |
| 3,224,849 | 12/1965 | Dille | 48—206 |

JOSEPH SCOVRONEK, Primary Examiner

S. MARANTZ, Assistant Examiner

U.S. Cl. XR.

48—200; 252—373